(12) United States Patent
Ridgway et al.

(10) Patent No.: US 7,735,868 B2
(45) Date of Patent: Jun. 15, 2010

(54) ADJUSTABLE STEERING COLUMN ASSEMBLY FOR A VEHICLE

(75) Inventors: Jason R. Ridgway, Bay City, MI (US); Ravi Ravindra, Saginaw, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 608 days.

(21) Appl. No.: 11/704,657

(22) Filed: Feb. 9, 2007

(65) Prior Publication Data

US 2008/0191457 A1   Aug. 14, 2008

(51) Int. Cl.
*B62D 1/185*   (2006.01)
(52) U.S. Cl. .......................................... 280/775; 74/493
(58) Field of Classification Search ................. 280/775; 74/493, 495
See application file for complete search history.

(56) References Cited

U.S. PATENT DOCUMENTS

| | | | | |
|---|---|---|---|---|
| 2,867,309 | A * | 1/1959 | Martin ..................... | 192/219.7 |
| 3,302,478 | A * | 2/1967 | Pauwels ...................... | 74/493 |
| 3,866,876 | A | 2/1975 | Adams | |
| 4,793,204 | A * | 12/1988 | Kubasiak ..................... | 74/493 |
| 5,029,489 | A * | 7/1991 | Burmeister et al. ........... | 74/493 |
| 5,222,410 | A * | 6/1993 | Kinoshita .................... | 74/493 |
| 5,409,261 | A * | 4/1995 | Yamaguchi ................. | 280/775 |
| 5,452,624 | A * | 9/1995 | Thomas et al. ................ | 74/493 |
| 5,524,927 | A * | 6/1996 | Toussaint .................... | 280/777 |
| 5,711,189 | A | 1/1998 | Cartwright et al. | |
| 5,813,289 | A | 9/1998 | Renick et al. | |
| 5,820,163 | A * | 10/1998 | Thacker et al. .............. | 280/775 |
| 5,823,062 | A * | 10/1998 | Snell et al. ..................... | 74/493 |
| 5,823,487 | A | 10/1998 | Kirchhoff et al. | |
| 6,139,057 | A * | 10/2000 | Olgren et al. ............... | 280/775 |
| 6,419,269 | B1 * | 7/2002 | Manwaring et al. ......... | 280/775 |
| 6,422,651 | B1 | 7/2002 | Muhlberger et al. | |
| 6,591,709 | B1 * | 7/2003 | Kim et al. ..................... | 74/493 |
| 6,616,185 | B2 * | 9/2003 | Manwaring et al. ......... | 280/775 |

(Continued)

FOREIGN PATENT DOCUMENTS

EP     0818379 A2    1/1998

(Continued)

OTHER PUBLICATIONS

European Search Report dated Sep. 21, 2009 for European Application No. 08150701.

*Primary Examiner*—Paul N. Dickson
*Assistant Examiner*—Timothy Wilhelm

(57) ABSTRACT

An adjustable steering column assembly having an outer jacket and an inner jacket slidably disposed in the outer jacket for telescoping movement is disclosed. The assembly includes a locking device having a pivot pin coupled to the outer jacket and defining a pin axis. A pawl is coupled to the pivot pin and a lever having a cam surface is coupled to the pawl. The pawl rotates about the pin axis between an engaged position engaging the inner jacket and a disengaged position disengaging the inner jacket for preventing and allowing the telescoping movement, respectively. An extension is movable between a first position engaging a first portion of the cam surface and a second position engaging a second portion of the cam surface for moving the lever away from the inner jacket and causing the pawl to rotate about the pin axis to disengage the pawl from the inner jacket.

20 Claims, 8 Drawing Sheets

U.S. PATENT DOCUMENTS

| | | |
|---|---|---|
| 6,659,504 B2 | 12/2003 | Riefe et al. |
| 6,851,332 B2 * | 2/2005 | Bechtel et al. ............... 74/493 |
| 7,174,804 B2 * | 2/2007 | Adoline et al. ............... 74/493 |
| 7,293,481 B2 * | 11/2007 | Li et al. ............... 74/493 |
| 7,306,259 B2 * | 12/2007 | Tinnin et al. ............... 280/775 |
| 7,421,925 B2 * | 9/2008 | Korzan et al. ............... 74/492 |
| 2004/0089091 A1 * | 5/2004 | Bechtel et al. ............... 74/493 |
| 2005/0199087 A1 * | 9/2005 | Li et al. ............... 74/493 |
| 2007/0235998 A1 * | 10/2007 | Demmon et al. ............... 280/775 |

FOREIGN PATENT DOCUMENTS

GB    2311839 A    10/1997

* cited by examiner

ADJUSTABLE STEERING COLUMN ASSEMBLY FOR A VEHICLE

BACKGROUND OF THE INVENTION

1. Field of the Invention

The present invention relates to an adjustable steering column assembly for a vehicle, more specifically to an adjustable steering column assembly having a locking device.

2. Description of the Prior Art

Vehicles can be equipped with a steering column that adjusts the position of a steering wheel to enhance the comfort and safety of a user. For example, the steering column can provide telescoping movement for moving the steering wheel closer to and away from the user. Also, the steering column can provide raking movement to move the steering wheel up and down relative to the user. These features cooperate to enable the user to adjust the steering wheel to a desired, convenient position for operating the vehicle and for enabling the steering wheel to be moved out of the way to provide greater access to getting into and out of the driver's seat of the vehicle. Adjustable steering columns may include a handle coupled to a locking device for selectively allowing and preventing both the raking movement and the telescoping movement of the steering column simultaneously once the desired position of the steering wheel has been selected. However, the force required to move the handle to allow both the raking movement and the telescoping movement is large due to the simultaneous disengagement of the locking devices. In addition, when a vehicle is in a collision, typically the force applied to the inner jacket in the collision causes the inner jacket to slide a predetermined distance in the outer jacket.

Therefore, there remains a need to develop an adjustable steering column having a locking device that reduces the force to rotate a handle and prevents an inner jacket from sliding within an outer jacket during a collision.

SUMMARY OF THE INVENTION AND ADVANTAGES

The present invention provides for an adjustable steering column assembly having an outer jacket defining a longitudinal axis and an inner jacket slidably disposed in the outer jacket along the longitudinal axis for telescoping movement. The adjustable steering column assembly includes a locking device having a pivot pin coupled to the outer jacket and defining a pin axis. The locking device further includes a pawl coupled to the pivot pin and a lever coupled to the pawl with the lever having a cam surface. The pawl rotates about the pin axis between an engaged position engaging the inner jacket for preventing the telescoping movement and a disengaged position disengaging the inner jacket for allowing the telescoping movement. The locking device includes an extension movable between a first position engaging a first portion of the cam surface and a second position engaging a second portion of the cam surface for moving the lever away from the inner jacket and causing the pawl to rotate about the pin axis to disengage the pawl from the inner jacket.

The present invention therefore provides for a locking device having an extension movable between a first position and a second position for moving a lever away from an inner jacket which reduces the force to rotate a handle. In addition, the locking device prevents the inner jacket from sliding within an outer jacket during a collision.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
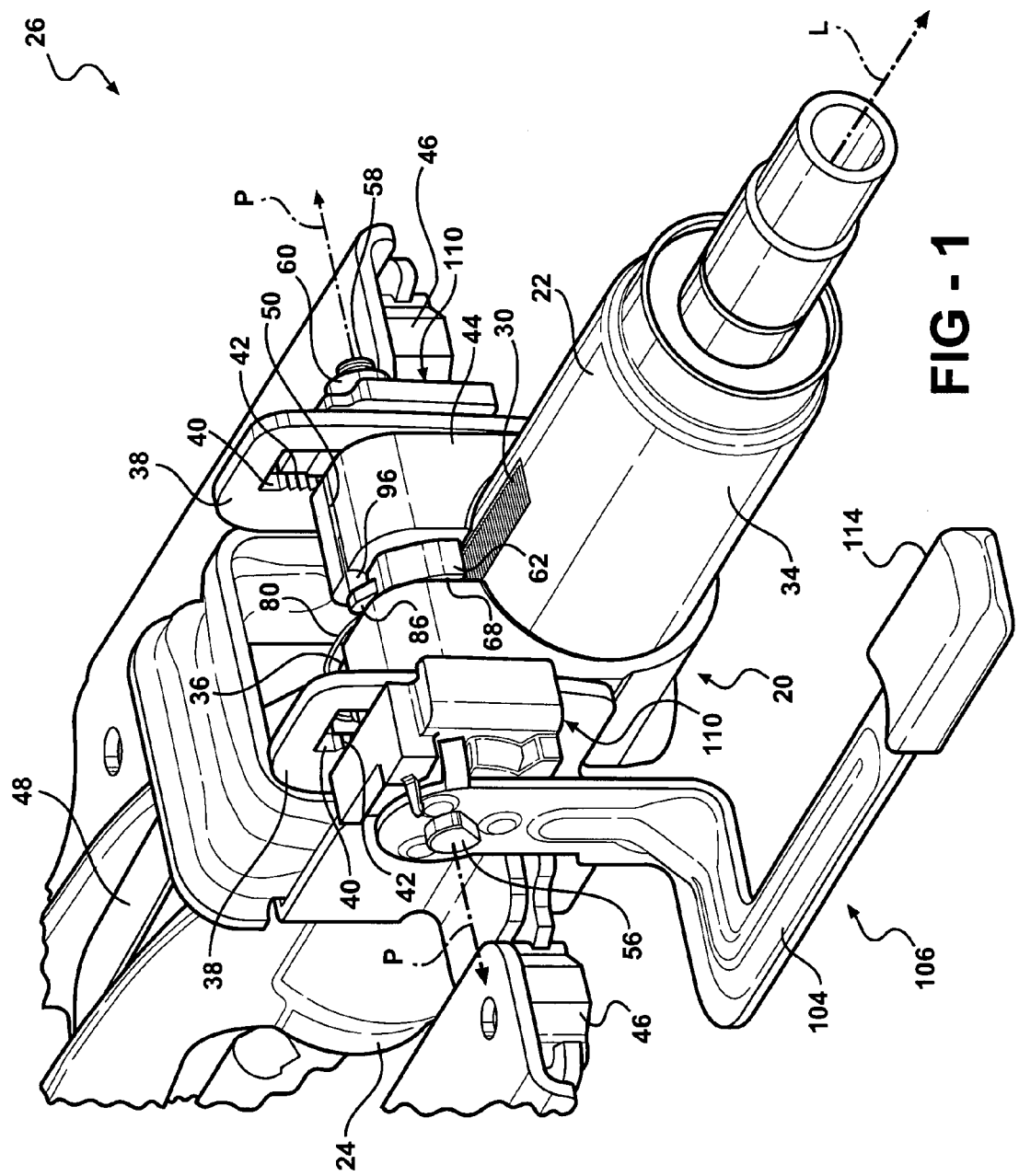
FIG. 1 is a fragmented perspective front view of an adjustable steering column assembly in accordance with the subject invention.
Figure 2:
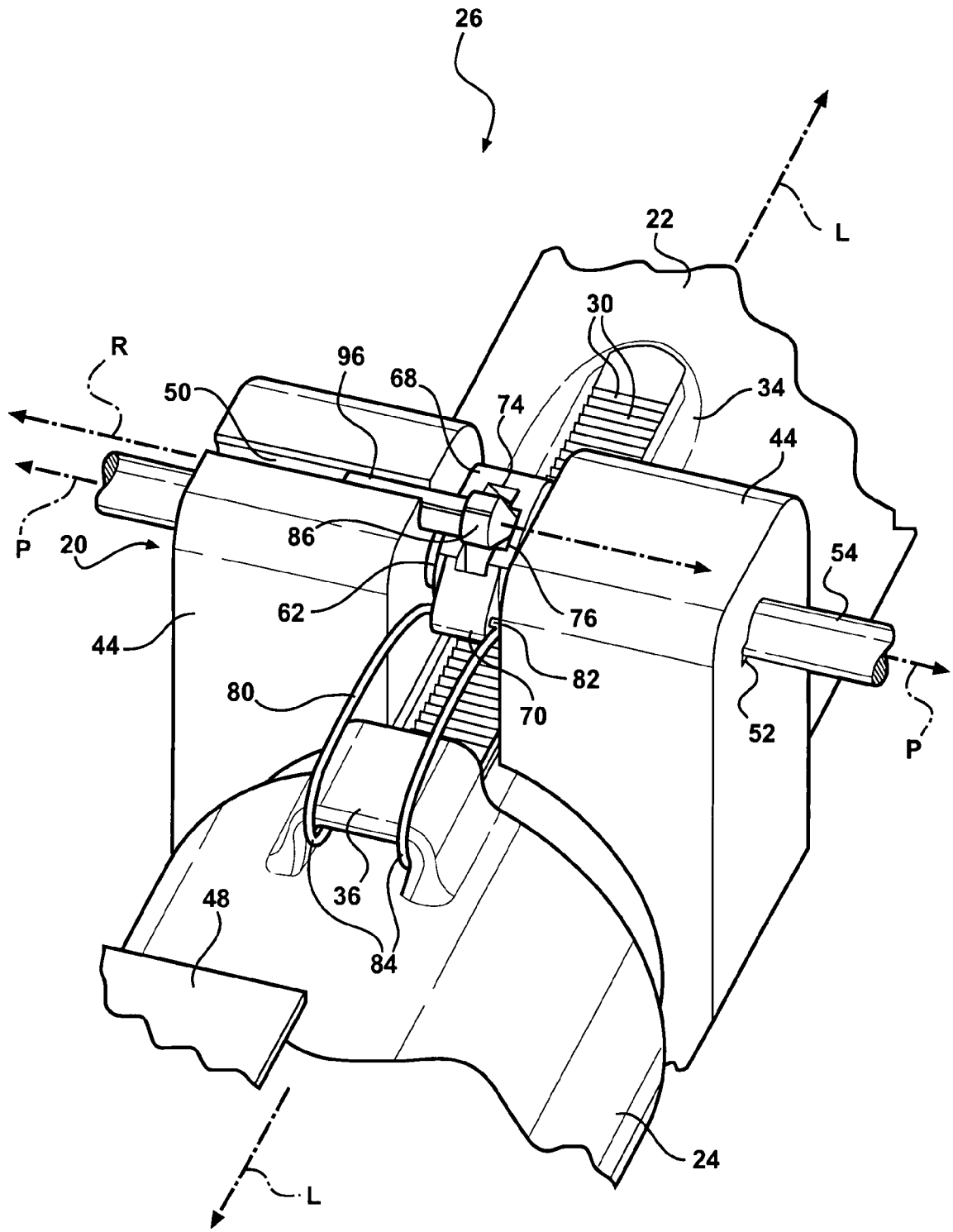
FIG. 2 is a fragmented perspective top view of the adjustable steering column assembly.

Referring to the Figures, wherein like numerals indicate like or corresponding parts throughout the several views, a locking device 20 for selectively preventing and allowing telescoping movement of a first member 22 relative to a second member 24 along a longitudinal axis L is generally shown in FIGS. 1 and 2.

In the embodiment shown in FIGS. 1-7, the locking device 20 is adapted to be used in an adjustable steering column assembly 26 for a vehicle (not shown). However, it is to be appreciated that the locking device 20 may be used in assemblies other than steering columns. For example, the locking device 20 may be used in scaffolding, jack stands, or for any other kind of device used for selectively preventing and allowing movement of telescoping members. As an example described with reference to FIGS. 1-7, the first member 22 will be referred to as an inner jacket 22 and the second member 24 will be referred to as an outer jacket 24.

As best shown in FIGS. 1 and 2, the adjustable steering column assembly 26 includes the outer jacket 24 defining the longitudinal axis L and the inner jacket 22 slidably disposed in the outer jacket 24 along the longitudinal axis L for the telescoping movement. A steering wheel (not shown) is coupled to the inner jacket 22. The user can telescopingly move the inner jacket 22 relative to the outer jacket 24 to obtain a desired position of the steering wheel away from the user. In other words, the inner jacket 22 moves in or out of the outer jacket 24 which moves the steering wheel farther away or closer to the user, respectively. The inner jacket 22 includes a plurality of first teeth 30 disposed along the longitudinal axis L to define a row of teeth. The inner jacket 22 defines an outer surface 34 with the first teeth 30 recessed below the outer surface 34 of the inner jacket 22 for preventing engagement of the outer jacket 24 with the first teeth 30 of the inner jacket 22 during the telescoping movement. In other words, the first teeth 30 are disposed away from the outer jacket 24 to prevent a zipper noise when the inner jacket 22 slides within the outer jacket 24. The outer jacket 24 further includes a latch 36 adjacent the first teeth 30 of the inner jacket 22 which will be discussed below.

A bracket 38 is coupled to the steering column assembly 26 for supporting the inner jacket 22 and the outer jacket 24 to allow raking movement. The user can rakingly move the inner jacket 22 and the outer jacket 24 to obtain the desired position of the steering wheel away from the user. In other words, the inner jacket 22 and the outer jacket 24 move together such that the steering wheel moves up and down relative to the user. The bracket 38 defines a plurality of holes 40 with a plurality of serrations 42 disposed in the holes 40. The bracket 38 is mounted to the vehicle and supports the inner jacket 22 and the outer jacket 24. The bracket 38 includes a plurality of capsules 46 which break free from the bracket 38 when a predetermined force is applied to the steering wheel in a collision of the vehicle. At least one energy absorbing strap 48 is disposed on the outer jacket 24 for absorbing energy when the predetermined force is applied to the steering wheel in the collision. The bracket 38, the capsules 46, and the energy absorbing strap 48 are well known to those skilled in the art and will not be discussed further. The locking device 20 prevents the inner jacket 22 from sliding within the outer jacket 24 in the collision for allowing the energy absorbing strap 48 to absorb the force applied to the steering wheel.

A support 44 is adapted to be coupled to the outer jacket 24 for supporting the locking device 20. The support 44 defines an opening 50 adjacent to the bracket 38 and defines a void 52 adjacent the opening 50. More specifically, the support 44 is disposed within the bracket 38 and may be coupled to the outer jacket 24 or integrally formed with the outer jacket 24.

Figure 3:
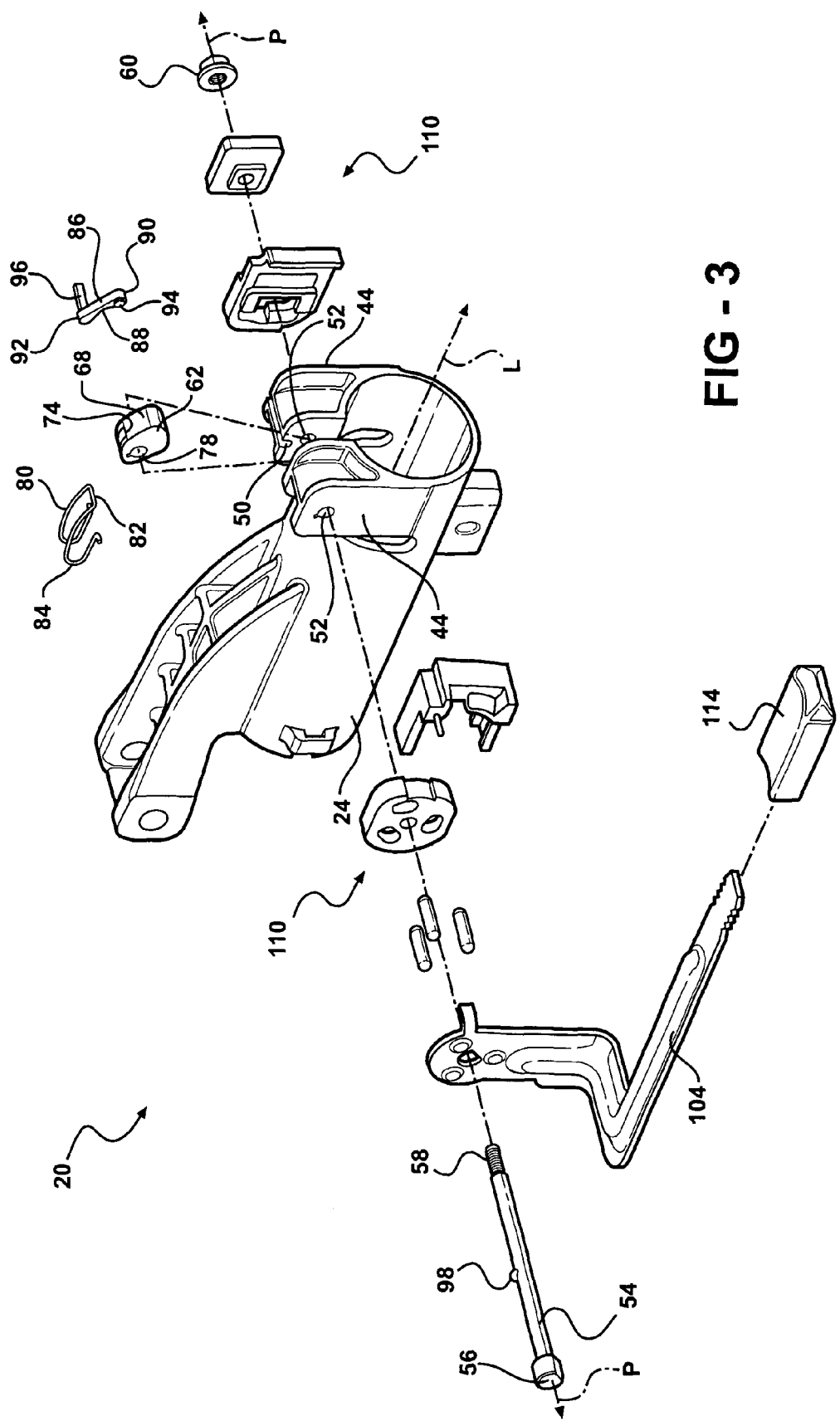
FIG. 3 is an exploded perspective view of an outer jacket, a locking device, and a rake locking device.

The locking device 20 includes a pivot pin 54 coupled to the outer jacket 24 and defining a pin axis P. More specifically, the pivot pin 54 is coupled to the support 44. Preferably, the pivot pin 54 is disposed through the void 52 and the pin axis P is transverse the longitudinal axis L. As shown in FIG. 3, the pivot pin 54 includes a head 56 and an end portion 58 spaced apart from each other. A nut 60 is disposed on the end portion 58 to prevent movement of the pivot pin 54 along the pin axis P.

Figure 4:
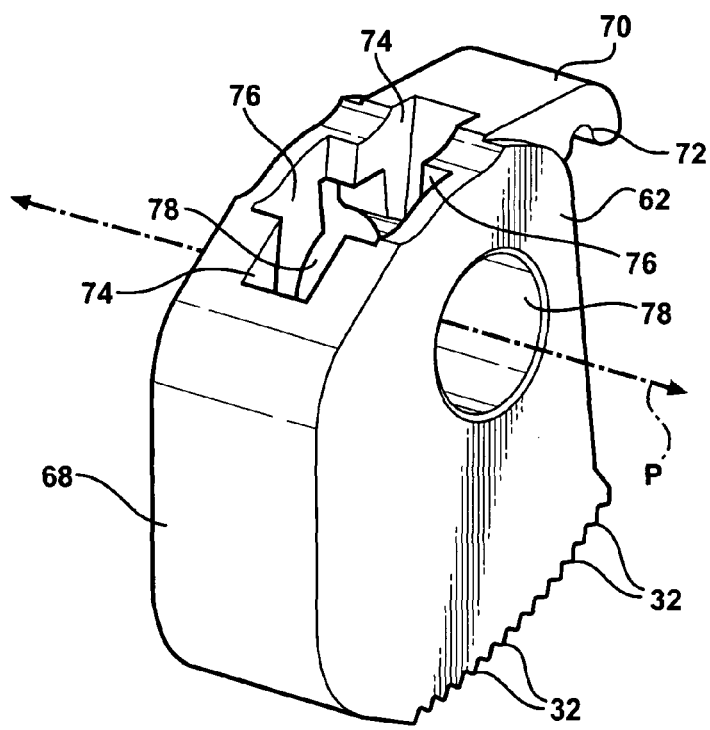
FIG. 4 is a perspective view of a pawl.
Figure 5:
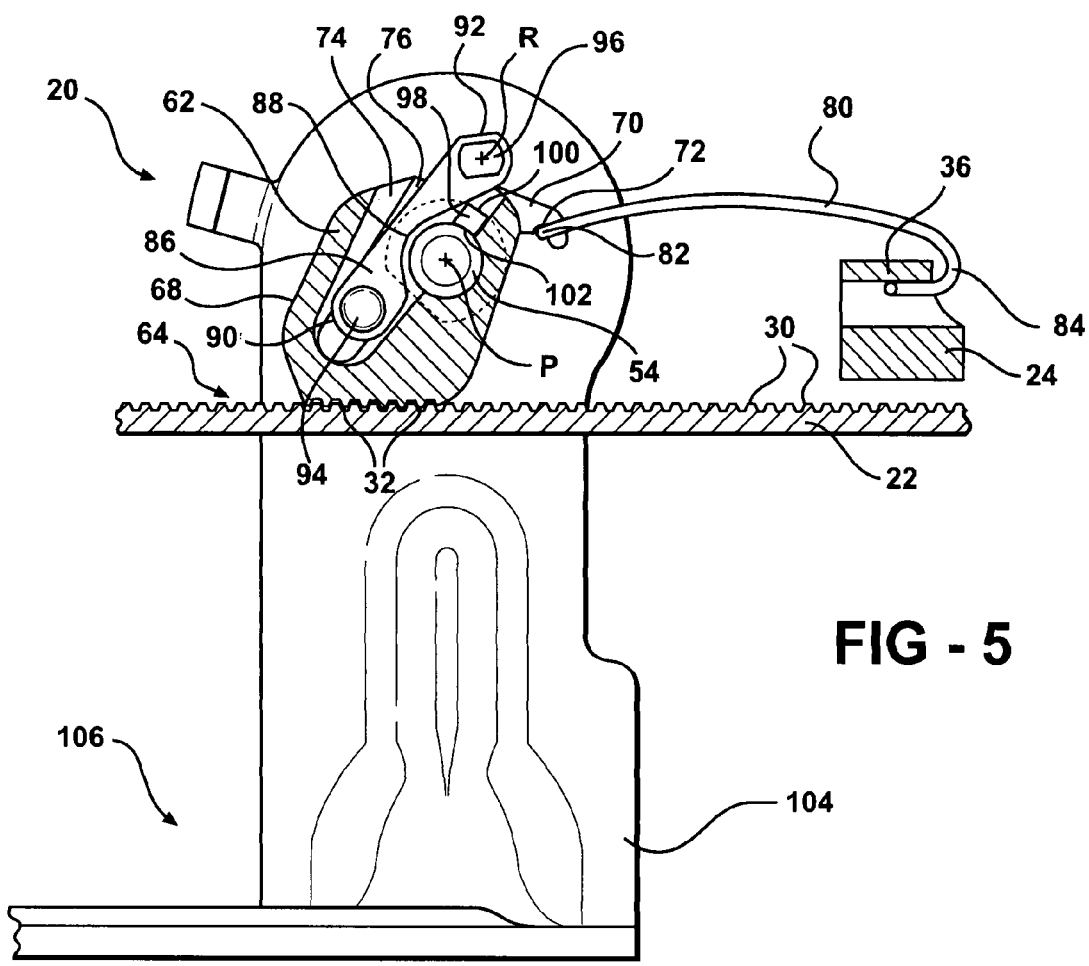
FIG. 5 is a fragmented partial sectional view of a handle in a locked position with the pawl engaging an inner jacket to prevent telescoping movement.
Figure 6:
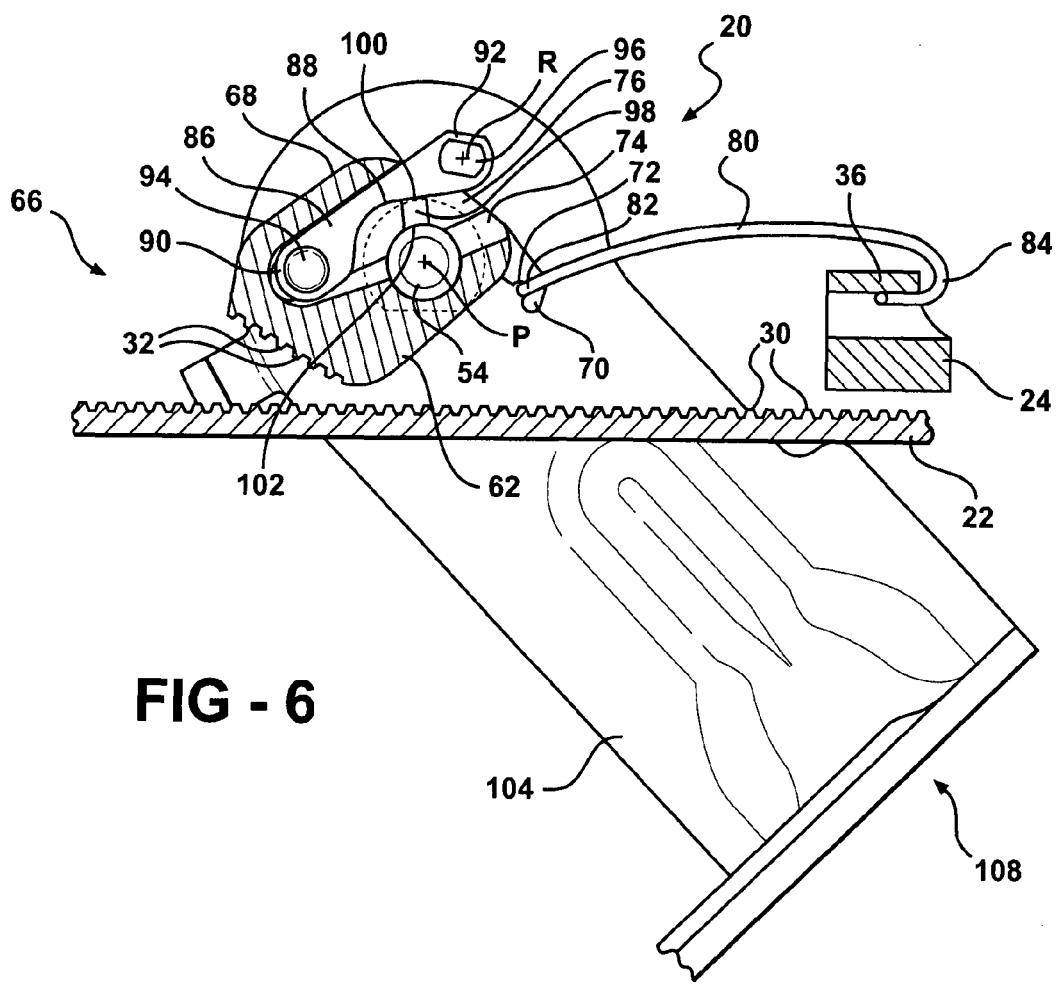
FIG. 6 is a fragmented partial sectional view of the handle in an unlocked position with the pawl disengaged from the inner jacket to allow telescoping movement.

Referring to FIGS. 4-6, a pawl 62 is coupled to the pivot pin 54 and rotatable about the pin axis P for selectively preventing the telescoping movement and allowing the telescoping movement. More specifically, the pawl 62 rotates about the pin axis P between an engaged position 64 engaging the inner jacket 22 for preventing the telescoping movement and a disengaged position 66 disengaging the inner jacket 22 for allowing the telescoping movement. The pawl 62 defines a periphery 68 and includes a finger 70 extending from the periphery 68 and away from the pivot pin 54. The finger 70 defines a recess 72 adjacent the periphery 68. The pawl 62 defines a cavity 74 adjacent the finger 70 and defines a slot 76 adjacent the cavity 74. The pawl 62 further defines a channel 78 adjacent the cavity 74 for receiving the pivot pin 54. The pawl 62 further includes a plurality of second teeth 32 for cooperating with the first teeth 30 of the inner jacket 22 to prevent the telescoping movement. More specifically, the second teeth 32 are disposed on the periphery 68 of the pawl 62 for cooperating with the first teeth 30 of the inner jacket 22.

A return spring 80 is coupled to the outer jacket 24 and the pawl 62 for continuously biasing the pawl 62 into engagement with the inner jacket 22. More specifically, the return spring 80 includes a base portion 82 and a hook portion 84 with the hook portion 84 extending away from the base portion 82 such that the base portion 82 is disposed in the recess 72 of the finger 70 and the hook portion 84 is coupled to the latch 36 of the outer jacket 24 for continuously bias the pawl 62 into engagement with the inner jacket 22.

Figure 7:
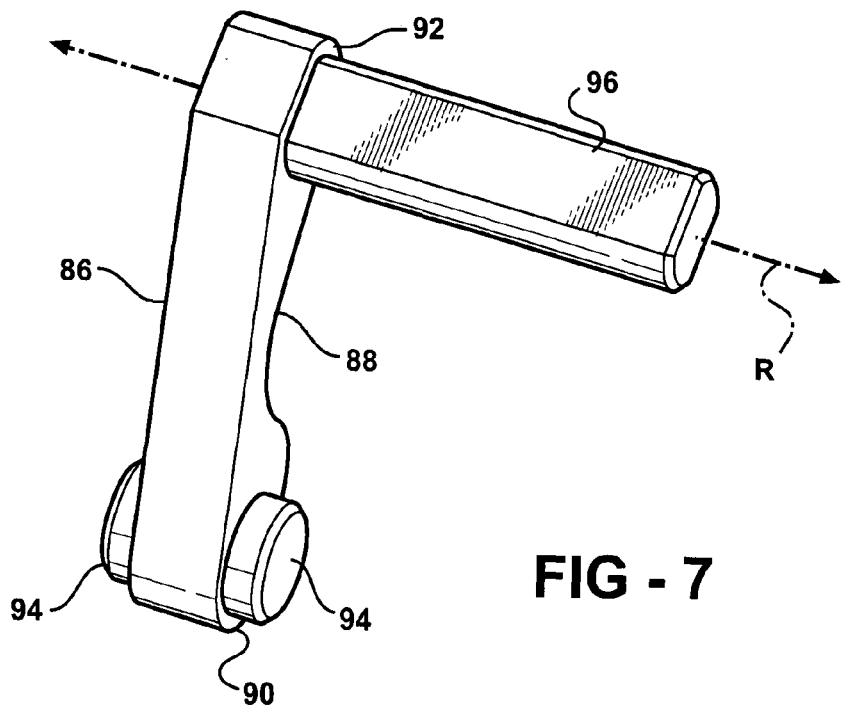
FIG. 7 is a perspective view of a lever.

Also referring to FIG. 7, a lever 86 having a cam surface 88 is coupled to the pawl 62. The lever 86 includes a first end 90 and a second end 92 with the first end 90 coupled to the pawl 62 for facilitating rotation of the pawl 62 during movement of the lever 86. The cam surface 88 is further defined as an arcuate profile disposed between the first and second ends 90, 92 of the lever 86. The cavity 74 of the pawl 62 receives the first end 90 of the lever 86. In addition, the slot 76 of the pawl 62 receives the first end 90 of the lever 86 such that rotation of the lever 86 allows the first end 90 of the lever 86 to move along the slot 76 to rotate the pawl 62 about the pin axis P. More specifically, the first end 90 of the lever 86 further includes at least one protrusion 94 for cooperating with the slot 76 of the pawl 62 such that rotation of the lever 86 allows the protrusion 94 to move along the slot 76 to rotate the pawl 62 about the pin axis P. The second end 92 of the lever 86 includes a rod 96 coupled to the outer jacket 24 and defining a rod axis R with the lever 86 rotatable about the rod axis R. More specifically, the rod 96 is disposed in the opening 50 of the support 44 and the rod axis R is parallel to the pin axis P. Preferably, the rod axis R is parallel to the pin axis P and transverse the longitudinal axis L.

Referring to FIGS. 3, 5, and 6, the locking device 20 further includes an extension 98 movable between a first position engaging a first portion of the cam surface 88 and a second position engaging a second portion of the cam surface 88 for moving the lever 86 away from the pivot pin 54 and causing the pawl 62 to rotate about the pin axis P. More specifically, the extension 98 is movable between the first position engaging the first portion of the cam surface 88 and the second position engaging the second portion of the cam surface 88 for moving the lever 86 away from the inner jacket 22 and causing the pawl 62 to rotate about the pin axis P to disengage the pawl 62 from the inner jacket 22. The force required to engage and disengage the pawl 62 from the inner jacket 22 is low due to the extension 98 being disposed on the pivot pin 54 and within the pawl 62. The void 52 of the support 44 and the channel 78 of the pawl 62 are complementary in shape to the pivot pin 54 and the extension 98 for feeding the extension 98 through the support 44 and into the cavity 74 of the pawl 62. Only one side of the channel 78 of the pawl 62 is configured to complement both the extension 98 and the pivot pin 54 for preventing the extension 98 from moving through the other side of the pawl 62. In other words, the other side of the channel 78 only complements the shape of the pivot pin 54 so the pivot pin 54 can extend completely through the pawl 62.

The extension 98 includes a distal end 100 and a proximal end 102 with the extension 98 disposed adjacent the arcuate profile of the cam surface 88. Preferably, the distal end 100 of the extension 98 engages the cam surface 88 between the first end 90 and the second end 92 during rotation of the pivot pin 54. Preferably, the proximal end 102 of the extension 98 is coupled to the pivot pin 54. The extension 98 is further defined as a bead disposed on the pivot pin 54 with the pivot pin 54 rotatable relative to the outer jacket 24 such that the bead engages the arcuate profile during the rotation of the pivot pin 54. The void 52 of the support 44 and the channel 78 of the pawl 62 are complementary in shape to the pivot pin 54 and the bead for feeding the bead through the support 44 and into the cavity 74 of the pawl 62. Only one side of the channel 78 of the pawl 62 is configured to complement both the bead and the pivot pin 54 for preventing the bead from moving through the other side of the pawl 62. It is to be appreciated that the bead may be integrally formed with the pivot pin 54, forged, machined, welded or coupled to the pivot pin 54 in any other method known to those skilled in the art. It is also to be appreciated that the bead may be circular, oval, oblong, square, or any other suitable configuration.

A handle 104 is coupled to the pivot pin 54 and rotatable about the pin axis P such that the rotation of the handle 104 in one direction about the pin axis P rotates the extension 98 to engage the arcuate profile of the cam surface 88 for rotating the pawl 62 about the pin axis P in an opposite direction from the handle 104. More specifically, when the handle 104 rotates in one direction about the pin axis P, the extension 98 rotates in the same direction as the handle 104 which causes the extension 98 to engage the arcuate profile of the cam surface 88 and rotate the lever 86 in an opposite direction from the handle 104 which rotates the pawl 62 in the same direction as the lever 86. The handle 104 includes an end cap 114 for grasping the handle 104. The handle 104 rotates about the pin axis P between a locked position 106 securing the pawl 62 to the inner jacket 22 for preventing the telescoping movement and an unlocked position 108 releasing the pawl 62 from the inner jacket 22 for allowing the telescoping movement. The force required to rotate the handle 104 from the locked and unlocked positions 106, 108 are low due to the extension 98 being disposed on the pivot pin 54 and within the pawl 62. The head 56 of the pivot pin 54 abuts the handle 104 for preventing movement of the handle 104 along the pin axis P.

Figure 9:
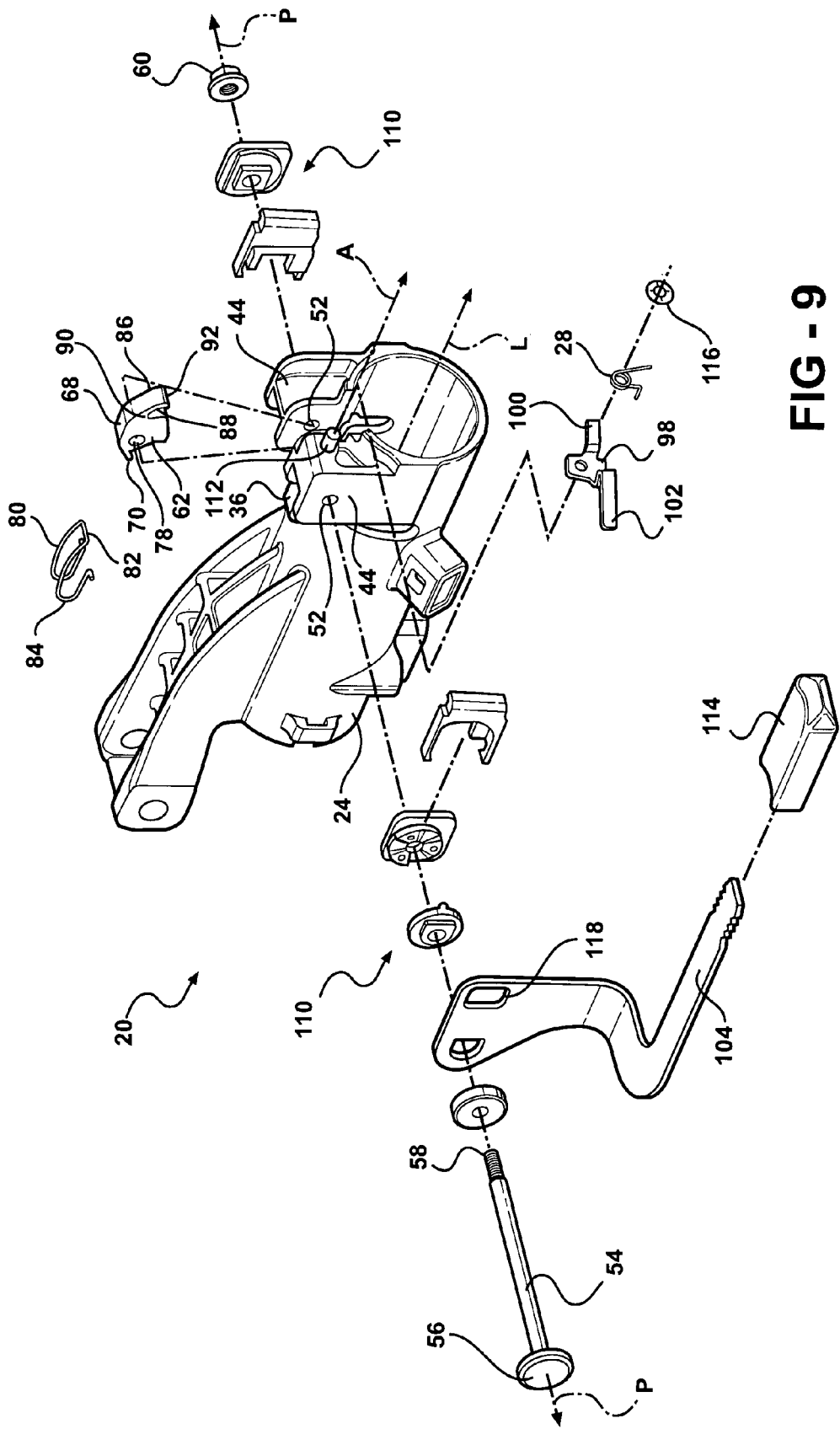
FIG. 9 is an exploded perspective view of the outer jacket, the locking device, and the rake locking device of the second embodiment.

A rake locking device 110 may be coupled to the bracket 38 and cooperates with the holes 40 and the serrations 42 of the bracket 38 for selectively allowing and preventing the raking movement of the inner and outer jackets 22, 24. More specifically, the rake locking device 110 is coupled to pivot pin 54 and the handle 104. The rake locking device 110 may be further defined as a 3-pin device as shown in FIG. 3 or a cam device as shown in FIG. 9. 3-pin devices and cam devices are well known to those skilled in the art and will not be discussed further. It is to be appreciated that any kind of device may be used for allowing and preventing the raking movement as known to those skilled in the art. It is also to be appreciated that the rake locking device 110 is optional.

Referring to FIGS. 5 and 6, to adjust the position of the steering wheel, the handle 104 is rotated about the pin axis P from the locked position 106 to the unlocked position 108. As the handle 104 rotates, the pivot pin 54 rotates about the pin axis P which rotates the extension 98 about the pin axis P in the same direction as the handle 104 rotates. The extension 98 engages the arcuate profile of the cam surface 88 for rotating the lever 86 about the rod axis R in the opposite direction the handle 104 is rotating. The protrusion 94 of the lever 86 moves along the slot 76 of the pawl 62 for rotating the pawl 62 about the pin axis P in the opposite direction the handle 104 is rotating to disengage the second teeth 32 of the pawl 62 from the first teeth 30 of the inner jacket 22 to allow the telescoping movement. Simultaneously with the handle 104 rotating, the rake locking device 110 disengages from the serrations 42 of the bracket 38 to allow the raking movement as known to those skilled in the art and will not be discussed further. The force required to rotate the handle 104 is low due to the extension 98 being disposed on the pivot pin 54 and within the pawl 62.

Figure 8:
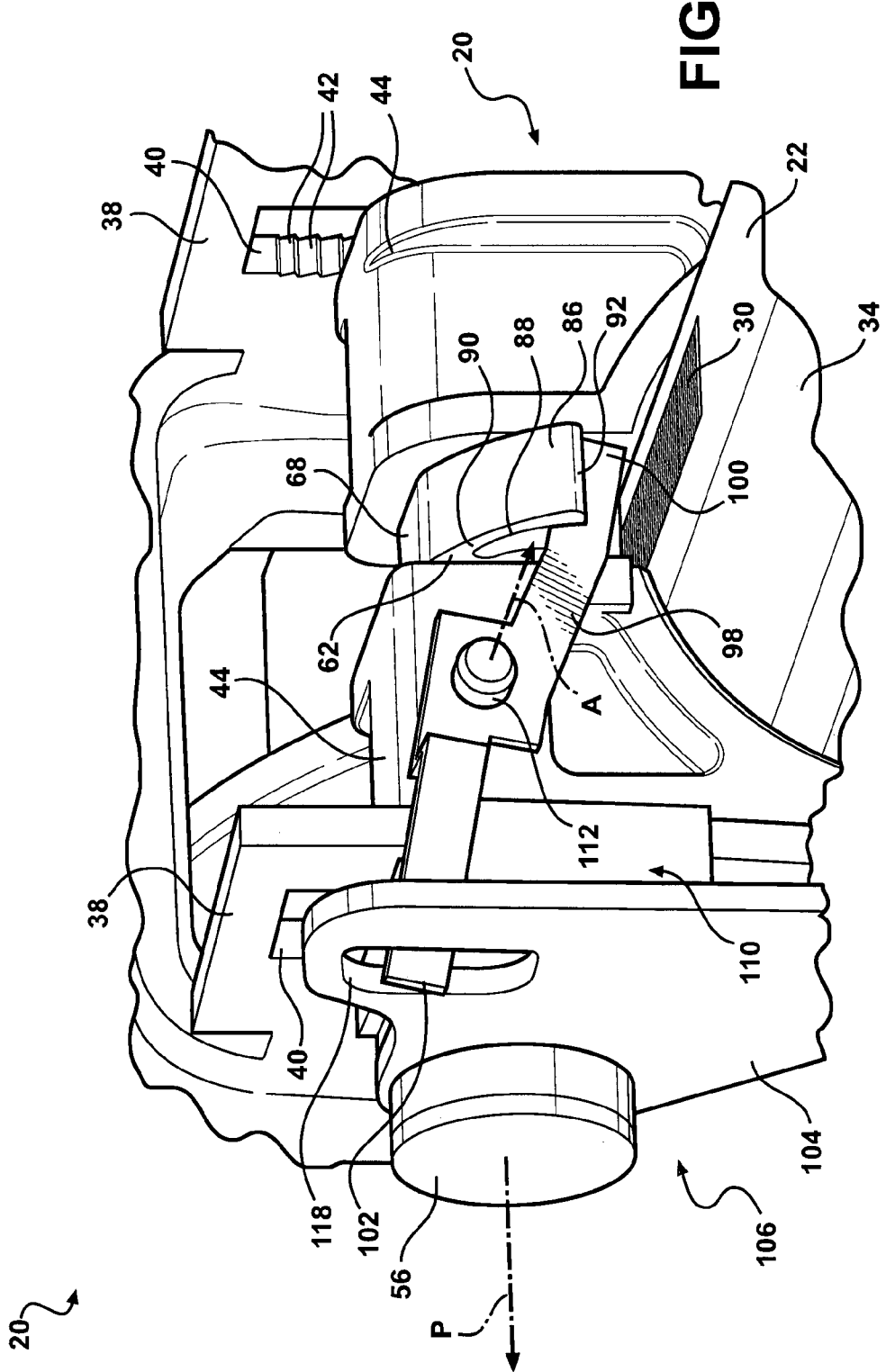
FIG. 8 is a fragmented perspective view of an adjustable steering column assembly of a second embodiment having a handle in a locked position with a pawl engaging an inner jacket to prevent telescoping movement.
Figure 10:
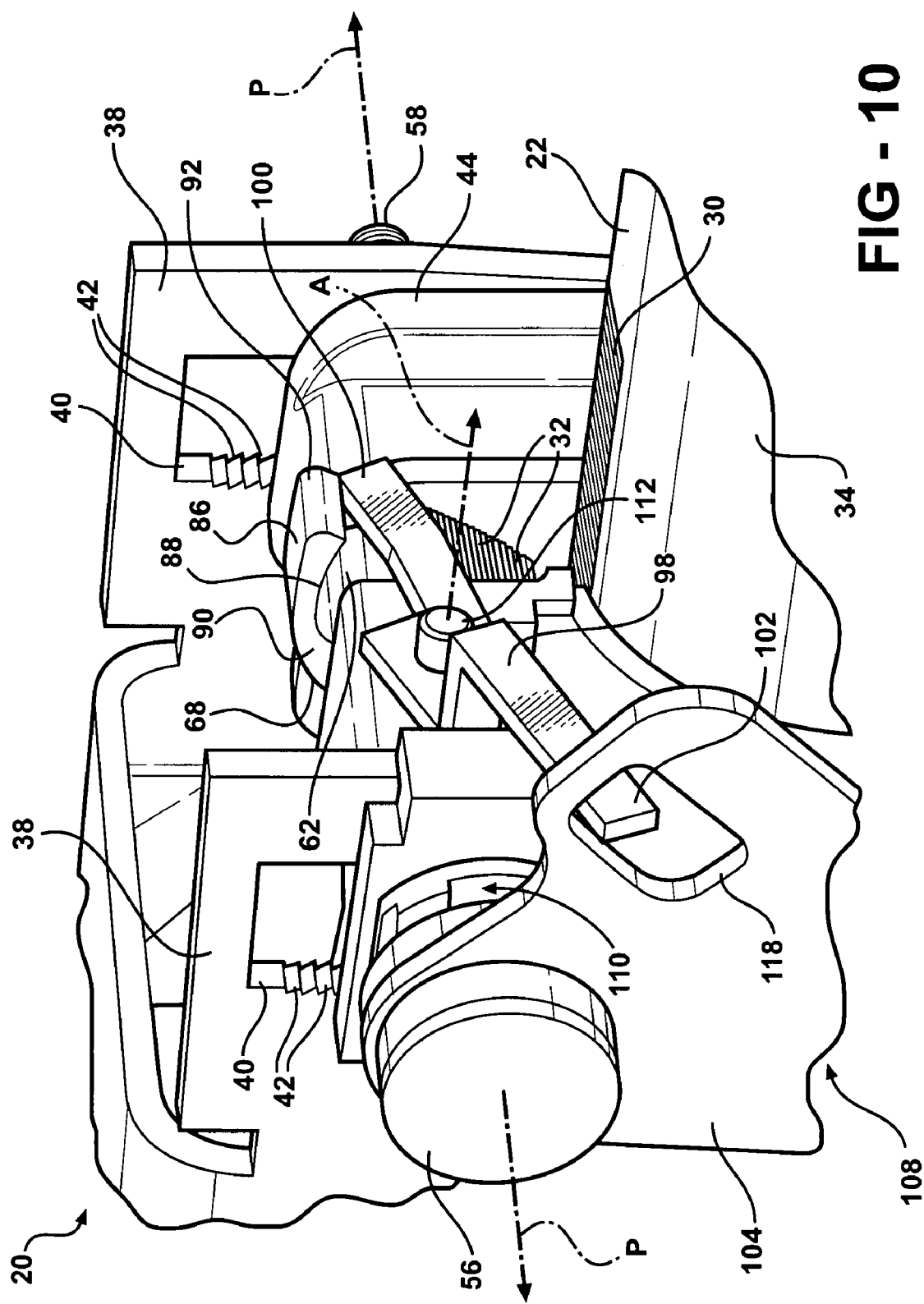
FIG. 10 is a fragmented perspective view of the handle of the second embodiment in an unlocked position with the pawl disengaged from the inner jacket to allow telescoping movement.

Referring to FIGS. 8-10, a second embodiment of the adjustable steering column assembly 26 for a vehicle, wherein like numerals indicate like or corresponding parts throughout the several views, is generally shown. The primary distinction between the first embodiment and the second embodiment are the configurations of the pawl 62 and the lever 86 and the location of the extension 98. As another example as described with reference to FIGS. 8-10, the first member 22 will be referred to as an inner jacket 22 and the second member 24 will be referred to as an outer jacket 24.

In this embodiment, the cavity 74 and the slot 76 of the pawl 62 are eliminated such that the lever 86 is disposed on the periphery 68 of the pawl 62 with the lever 86 and the pawl 62 rotating in the same direction during rotation of the extension 98. More specifically, the rod 96 and the protrusion 94 are eliminated from the lever 86. In addition, the rod axis R is eliminated. Preferably, the first end 90 of the lever 86 is disposed on the periphery 68 of the pawl 62. It is to be appreciated that the lever 86 may be integrally formed with the pawl 62. In other words, the pawl 62 and the lever 86 may be formed of a homogenous material. However, it is to be appreciated that the lever 86 may be coupled to the pawl 62 in any suitable way known to those skilled in the art. The channel 78 of the pawl 62 complements the shape of the pivot pin 54 only due to the extension 98 being removed from the pivot pin 54.

A post 112 is coupled to the outer jacket 24 with the extension 98 coupled to the post 112 for supporting the extension 98 and facilitating rotation of the extension 98 about a post axis A during the rotation of the handle 104. More specifically, the post 112 is coupled to the support 44 with the extension 98 coupled to the post 112 for supporting the extension 98 and facilitating rotation of the extension 98 about the post axis A during the rotation of the handle 104. The extension 98 is coupled to the post 112 between the distal and proximal ends 100, 102. The force required to rotate the handle 104 is low due to the extension 98 being disposed on the post 112. Preferably, the post axis A is parallel to the longitudinal axis L. In other words, the post axis A and the longitudinal axis L are transverse to the pin axis P. However, it is to be appreciated that the post axis A may be any orientation relative to the longitudinal axis L and the pin axis P. As shown in FIG. 9, a spring member 28 is disposed on the post 112 and coupled to the extension 98 for continuously biasing the distal end 100 of the extension 98 away from the cam surface 88 of the lever 86. A fastener 116 is disposed on the post 112 for retaining the spring member 28.

The handle 104 defines an aperture 118 for receiving the extension 98 and rotating the extension 98 about the post axis A during the rotation of the handle 104. More specifically, the proximal end 102 of the extension 98 is disposed through the aperture 118 of the handle 104 such that rotation of the handle 104 causes the extension 98 to rotate about the post axis A. In other words, when the handle 104 rotates in one direction about the pin axis P, the extension 98 rotates about the post axis A which causes the distal end 100 of the extension 98 to engage the arcuate profile of the cam surface 88 and rotate the lever 86 and the pawl 62 in the opposite direction from the handle 104. The force required to rotate the handle 104 from the locked and unlocked positions 106, 108 are low due to the extension 98 being disposed on the post 112.

Referring to FIGS. 8 and 10, to adjust the position of the steering wheel, the handle 104 is rotated about the pin axis P from the locked position 106 to the unlocked position 108. As the handle 104 rotates, the extension 98 rotates about the post axis A which causes the distal end 100 of the extension 98 to engage the cam surface 88 of the lever 86. The lever 86 and the pawl 62 rotate about the pin axis P in the opposite direction from the handle 104 for disengaging the second teeth 32 of the pawl 62 from the first teeth 30 of the inner jacket 22 to allow the telescoping movement. Simultaneously with the handle 104 rotating, the rake locking device 110 disengages from the serrations 42 of the bracket 38 to allow the raking movement as known to those skilled in the art and will not be discussed further. The force required to rotate the handle 104 is low due to the extension 98 being disposed on the post 112.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. An adjustable steering column assembly for a vehicle, said assembly comprising:
    an outer jacket defining a longitudinal axis,
    an inner jacket slidably disposed in said outer jacket along said longitudinal axis for telescoping movement,
    a pivot pin coupled to said outer jacket and defining a pin axis,
    a pawl coupled to said pivot pin and rotatable about said pin axis between an engaged position engaging said inner jacket for preventing said telescoping movement and a disengaged position disengaging said inner jacket for allowing said telescoping movement,
    a lever coupled to said pawl and having a cam surface, and
    an extension movable between a first position engaging a first portion of said cam surface and a second position engaging a second portion of said cam surface for moving said lever away from said inner jacket and causing said pawl to rotate about said pin axis to disengage said pawl from said inner jacket.

2. An assembly as set forth in claim 1 wherein said lever includes a first end and a second end with said first end coupled to said pawl for facilitating said rotation of said pawl during said movement of said lever.

3. An assembly as set forth in claim 2 wherein said cam surface is further defined as an arcuate profile adjacent said extension and disposed between said first and second ends of said lever.

4. An assembly as set forth in claim 3 further including a handle coupled to said pivot pin and rotatable about said pin axis such that said rotation of said handle in one direction about said pin axis rotates said extension to engage said arcuate profile of said cam surface for rotating said pawl about said pin axis in an opposite direction from said handle.

5. An assembly as set forth in claim 1 further including a return spring coupled to said outer jacket and said pawl for continuously biasing said pawl into engagement with said inner jacket.

6. An assembly as set forth in claim 1 wherein said inner jacket includes a plurality of first teeth disposed along said longitudinal axis to define a row of teeth and said pawl includes a plurality of second teeth for cooperating with said first teeth of said inner jacket to prevent said telescoping movement.

7. An assembly as set forth in claim 6 wherein said inner jacket defines an outer surface with said first teeth recessed below said outer surface of said inner jacket for preventing engagement of said outer jacket with said first teeth of said inner jacket during said telescoping movement.

8. An assembly as set forth in claim 2 wherein said second end of said lever includes a rod coupled to said outer jacket and defining a rod axis with said lever rotatable about said rod axis.

9. An assembly as set forth in claim 2 wherein said pawl defines a cavity for receiving said first end of said lever.

10. An assembly as set forth in claim 9 wherein said pawl defines a slot adjacent said cavity for receiving said first end of said lever such that rotation of said lever allows said first end of said lever to move along said slot to rotate said pawl about said pin axis.

11. An assembly as set forth in claim 3 wherein said extension is further defined as a bead disposed on said pivot pin with said pivot pin rotatable relative to said outer jacket such that said bead engages said arcuate profile during said rotation of said pivot pin.

12. An assembly as set forth in claim 4 further including a post coupled to said outer jacket with said extension coupled to said post for supporting said extension and facilitating rotation of said extension about a post axis during said rotation of said handle.

13. An assembly as set forth in claim 12 wherein said handle defines an aperture for receiving said extension and rotating said extension about said post axis during said rotation of said handle.

14. A locking device for selectively preventing and allowing telescoping movement of a first member relative to a second member along a longitudinal axis, said device comprising:
    a support adapted to be coupled to the second member,
    a pivot pin coupled to said support and defining a pin axis,
    a handle coupled to said pivot pin and rotatable about said pin axis,
    a pawl coupled to said pivot pin and rotatable about said pin axis for selectively preventing telescoping movement and allowing telescoping movement,
    a lever coupled to said pawl and having a cam surface, and
    an extension movable between a first position engaging a first portion of said cam surface and a second position engaging a second portion of said cam surface for moving said lever away from said pivot pin and causing said pawl to rotate about said pin axis.

15. A device as set forth in claim 14 wherein said lever includes a first end and a second end with said cam surface defining an arcuate profile disposed between said first and second ends with said first end coupled to said pawl for facilitating said rotation of said pawl during said movement of said lever.

16. A device as set forth in claim 15 wherein rotation of said handle in one direction about said pin axis rotates said extension to engage said arcuate profile of said cam surface for rotating said pawl about said pin axis in an opposite direction from said handle.

17. A device as set forth in claim 15 wherein said extension is further defined as a bead disposed on said pivot pin with said pivot pin rotatable relative to said support such that said bead engages said arcuate profile during said rotation of said pivot pin.

18. A device as set forth in claim 15 wherein said second end of said lever includes a rod coupled to said support and defining a rod axis with said lever rotatable about said rod axis.

19. A device as set forth in claim 15 wherein said pawl defines a cavity and a slot adjacent said cavity for receiving said first end of said lever such that rotation of said lever allows said first end of said lever to move along said slot to rotate said pawl about said pin axis.

20. A device as set forth in claim 16 further including a post coupled to said support with said extension coupled to said post for supporting said extension and facilitating rotation of said extension about a post axis during said rotation of said handle.

* * * * *